United States Patent [19]
Paul

[11] 4,353,775
[45] * Oct. 12, 1982

[54] APPARATUS FOR APPLYING GASKET-FORMING MATERIAL TO WORKPIECES

[76] Inventor: William A. Paul, 2338 Townley Rd., Toledo, Ohio 43614

[*] Notice: The portion of the term of this patent subsequent to Jun. 16, 1998, has been disclaimed.

[21] Appl. No.: 272,115

[22] Filed: Jun. 10, 1981

Related U.S. Application Data

[63] Continuation-in-part of Ser. No. 90,466, Nov. 1, 1979, Pat. No. 4,273,607.

[51] Int. Cl.³ .............................................. B44C 1/00
[52] U.S. Cl. .................................... 156/540; 118/213; 118/243; 118/263; 156/230; 156/384; 156/390; 156/566; 156/578; 156/580; 413/9; 413/19; 413/21; 413/57; 413/60; 425/110
[58] Field of Search .............. 156/540, 566, 230, 578, 156/384, 580, 390; 118/213, 263, 243; 264/259; 425/110; 100/215; 413/9, 57, 19, 60, 21

[56] References Cited

U.S. PATENT DOCUMENTS

| | | | |
|---|---|---|---|
| 624,835 | 5/1899 | Malchow et al. | 264/259 |
| 1,145,412 | 7/1915 | Furber | 118/263 |
| 2,264,628 | 12/1941 | Engert et al. | 156/291 |
| 3,232,815 | 2/1966 | Kloplanstein et al. | 156/566 |
| 4,102,304 | 7/1978 | Sebenham | 413/19 |
| 4,273,607 | 6/1981 | Paul | 156/540 |

Primary Examiner—John J. Gallagher
Attorney, Agent, or Firm—Allen D. Gutchess, Jr.

[57] ABSTRACT

Apparatus is provided for applying a bead of gasket-forming material to a mateable surface of a workpiece. The apparatus includes a source of gasket-forming material and a screen having a predetermined pattern conforming to the desired bead of the gasket-forming material. A spreader applies the gasket-forming material to one side of the screen and the gasket pattern is then formed on an adjacent transfer surface of a transfer pad on the opposite side of the screen. Means are provided for moving the pad with the pattern on the transfer surface and engaging it with the mateable surface of a workpiece mounted on a support spaced from the screen, thereby forming a bead of gasket-forming material on the mateable surface. The transfer surface is moved through an arc of 180° when moving between the screen and the workpiece surface.

16 Claims, 4 Drawing Figures

APPARATUS FOR APPLYING GASKET-FORMING MATERIAL TO WORKPIECES

This application is a continuation-in-part application of my co-pending application Ser. No. 90,466, filed Nov. 1, 1979, now U.S. Pat. No 4,273,607. My co-pending application, Ser. No. 272,278, filed on June 10, 1981 is also a continuation-in-part application of that patent.

Gasket-forming material is known in the art for effecting seals between the mateable surfaces of the workpieces. The material constitutes a substitute for conventional gaskets heretofore known, and as such has a number of advantages. A large gasket inventory is eliminated and there is no need to cut special gaskets for particular applications. Further, conventional gaskets can shrink or wear out to produce loosening and leakage, thereby requiring retorquing, as well as producing disassembly and removal problems. The gasket-forming material, on the other hand, frequently provides an improved seal and effectively seals scratched or otherwise damaged surfaces, as well as improves the structural integrity of the assembled workpieces.

The gasket material is commonly supplied in tubes or cartridges and a bead of the material is manually spread from a spout of a tube onto the surfae of the workpiece which is to be mated with a surface of another workpiece. Templates manipulated by hand have also been used to a limited extent where a number of workpieces are to have the beads of gasket-forming material applied. While the templates for applying the gasket-forming material are satisfactory for a few pieces, they have been inadequate for gasket-type seals on workpieces on a production basis. Further, because of the above-outlined advantages of the gasket-forming material, the desirability of applying the material quickly and accurately in production has accordingly increased.

The present invention provides apparatus for applying the gasket-forming material to mateable surfaces of workpieces in a rapid, accurate, and efficient manner. In accordance with the invention, an applicator supplies gasket material from a source to a transfer surface of a transfer pad. The gasket-forming material is positioned on the pad in a pattern of the same size and shape as the bead of the material which is to be applied to a mateable surface of a workpiece. Moving means moves the transfer pad from the position in which the transfer surface is engagable with the applicator to a position in which the transfer surface is engagable with a workpiece to which the bead is to be applied. The workpiece is mounted on a suitable support which carries the workpiece to a station at which the mateable surface is engaged by the transfer pad and then beyond that station, with other workpieces sequentially moved into position for the application of the gasket-forming beads. The transfer surface is rotated through an arc of 180° as it moves between the applicator and the workpiece.

It is, therefore, a principal object of the invention to provide apparatus for applying gasket-forming material to mateable surfaces of a plurality of workpieces.

Another object of the invention is to provide apparatus for applying gasket-forming material to workpiece surfaces more efficiently and rapidly than heretofore.

Many other objects and advantages of the invention will be apparent from the following detailed description of a preferred embodiment thereof, reference being made to the accompanying drawings, in which.

Figure 1:
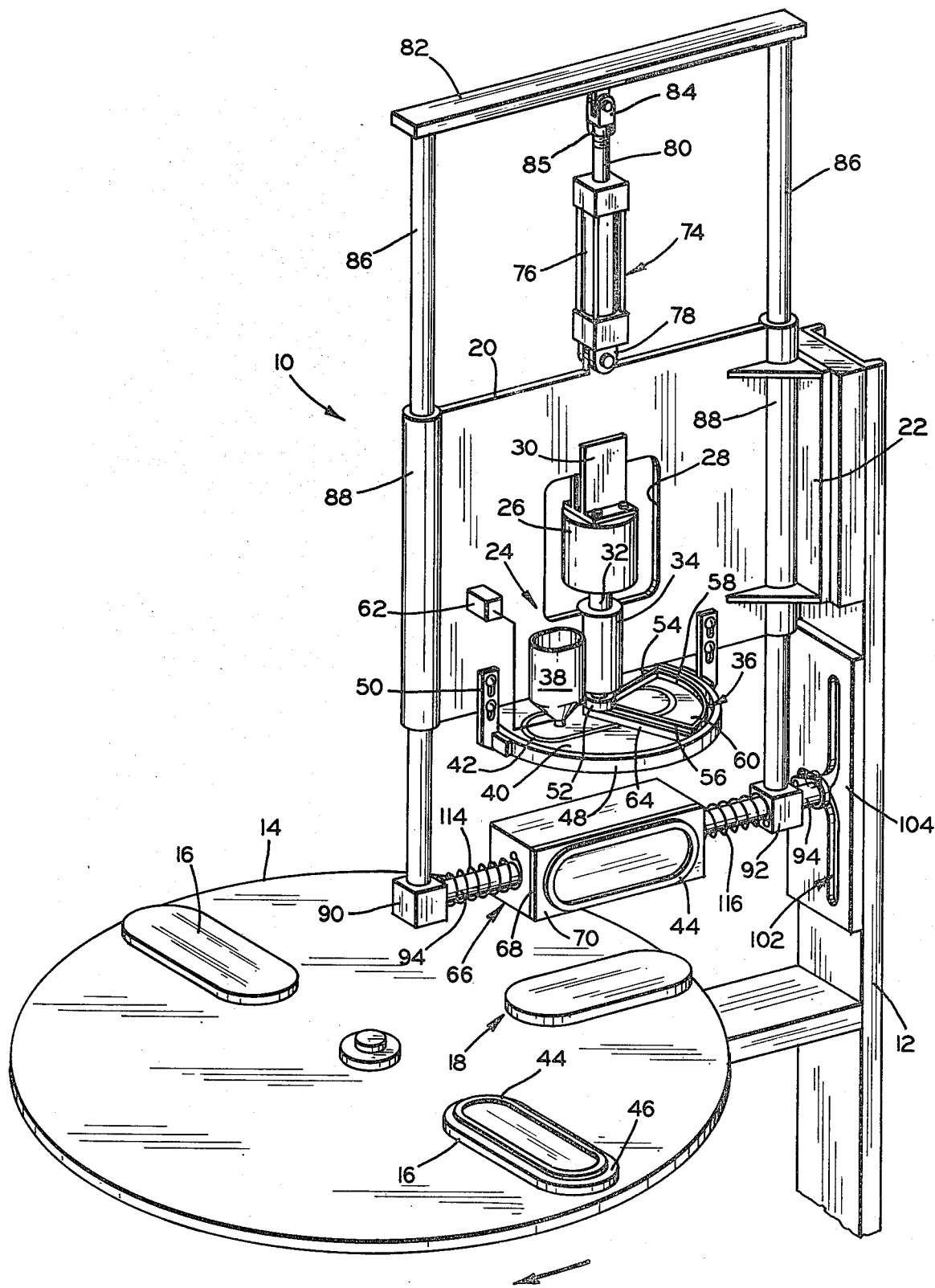
FIG. 1 is a somewhat schematic view in perspective of apparatus for applying beads of gasket-forming material in accordance with the invention.

Referring to the drawings, and particularly to FIG. 1, dapparatus for applying beads of gasket-forming material to mateable surfaces of workpieces is indicated at 10. The apparatus includes a supporting frame 12 positioned at one side of a turntable 14 which supports workpieces 16. The turntable sequentially moves the workpieces 16 to and then beyond a bead-applying station indicated at 18.

A supporting plate 20 is supported by and extends from the supporting frame 12 through a mounting plate 22, the plate 20 being directly above the bead-applying station 18. A gasket-forming material applicator is indicated at 24 and is supported by the plate 20. The applicator includes a motor 26, electrically driven, mounted in an opening 28 of the mounting plate 20 by a bracket 30. A motor shaft 32 extends through a bearing 34 to a rotatable distributor 36 located below the lower edge of the supporting plate 20. The distributor 36 spreads gasket-forming material from a source 38 which can be a cartridge or tube suitably mounted on the supporting plate 20. The gasket-forming material is spread over a screen 40 having a pattern 42 formed by minute openings in the screen, which pattern is of the same size and shape as a bead 44 of the gasket-forming material applied to a mateable surface 46 of the workpiece 16. The screen 40 is held by a circular frame 48 suspended from the supporting plate 20 by brackets 50.

The distributor 36 has a hub 52 from which extends a first radial arm 54, and a second radial arm 56, with an arcuate web 58 extending therebetween and forming a generally pie-shaped shallow cavity 60. Suitable control means indicated schematically at 62 controls the dispensing of the gasket-forming material from the cartridge 38 to dispense it only when the distributor 36 is therebelow so that the material only enters the cavity 60. The material is then spread over the screen 40 by a lower squeegee blade 64 depending from the radial arm 56 when the distributor rotates in a counterclockwise direction, as shown in FIG. 1. The arcuate web 58 is effective to minimize the migration of the gasket-forming material to the periphery of the screen 40 adjacent the circular frame 48. The first radial arm 54 can be spaced slightly above the screen 40 so that any gasket-forming material left thereon after a previous pass by the distributor 36 will not be shoved to the periphery of the screen by the arm 54.

Figure 3:
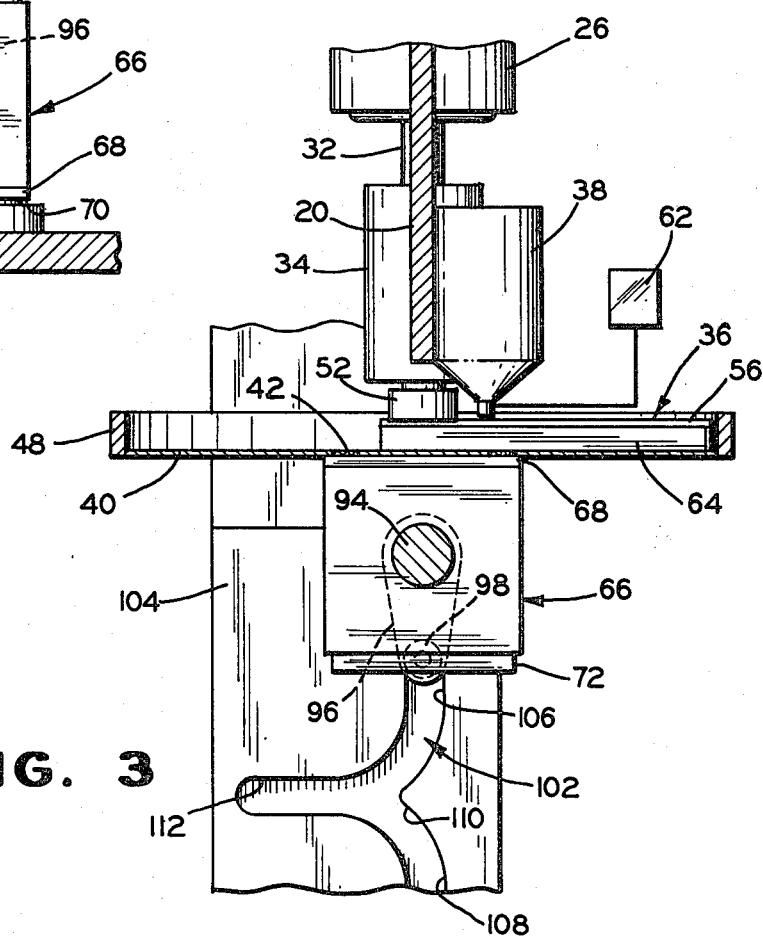
FIG. 3 is a fragmentary, schematic view in transverse section of portions of the apparatus of FIG. 1, shown in a different position.

A transfer member or block 66 has a transfer pad or layer 68 having a transfer surface 70 which receives gasket-forming material through the pattern 42 of the screen 40, when the surface 70 is adjacent the lower surface of the screen 40, as shown in FIG. 3. When the member 66 is moved to the lower position with the surface 70 near the workpiece 15, the gasket-forming material is transferred to the workpiece to form the bead 44, as shown in FIG. 1. In this instance, the surface of the transfer member 66 opposite the layer 68 has a counterweight 72 thereon to facilitate the arcuate movement of the member 66 when moved between the applicator 24 and the workpiece 16.

The transfer member 66 is moved up and down between the two positions by suitable moving means such as a fluid-operated ram 74. The ram 74 includes a fluid-operated cylinder 76 having a lower end connected to the upper edge of the supporting plate 20 by a clevis 78. A piston rod 80 extends upwardly from the cylinder 76 and has an upper end adjustably connected to a central portion of a transverse bar 82 through a clevis 84. The rod 80 is threaded in the clevis for adjustability and held by a jamb nut 85. The transfer bar 74 is suitably affixed to upper ends of guide rods 86 which extend through and are guided by bearing guides 88 located at vertical edge portions of the plate 20.

Figure 4:
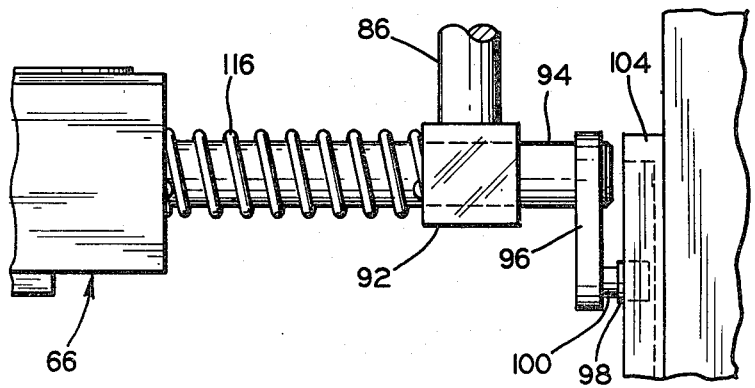
FIG. 4 is a fragmentary view in elevation of part of the apparatus of FIG. 3.

Bearing blocks 90 and 92 are carried by the lower ends of the guide rods 86 and, in turn, rotatably support a shaft 94 which extends through the bearing block 92. As shown, the shaft 94 also extends through the transfer member 66 and is affixed thereto, although, of course, two separate shafts could be employed at opposite ends of the transfer member 66. The end of the shaft 94 beyond the bearing block 92 has an arm or ear 96 (FIG. 4) affixed thereto, and carries a cam follower 98 on a stub shaft 100 spaced from the shaft 94. The cam follower 98 is received in a cam groove indicated at 102 formed in a cam plate 104 mounted on the supporting member 12. The cam groove 102 includes an upper straight portion 106, a lower straight portion 108, and an intermediate portion 110. The intermediate portion 110 can be described as being of a generally horizontal V-shaped configuration with a horizontal tail or branch 112 extending therefrom, with the branch being perpendicular to the upper and lower straight portions 106 and 108.

While the fluid-operated ram 74 provides the up and down movement for the transfer member 66 between the upper position adjacent the applicator 24 and the lower position adjacent the workpiece 16, the cam follower 98 and the groove 102 provide the arcuate movement of the transfer member 66 so that the surface 70 of the pad 68 moves through an arc of 180° when traveling between the applicator and the workpiece. With the member 66 in the upper position, as shown in FIG. 3, the pad 68 is held in a horizontal attitude by means of the arm 96 with the cam follower 98 being in the straight portion 106 of the groove. As the transfer member 66 moves downwardly, the cam follower 98 is directed into the branch 112, to the position shown in FIG. 1, with the pad 68 now in a vertical attitude. Further downward movement of the shaft 94 and the transfer member 66 causes the cam follower to move out of the branch 112 and into the lower straight portion 108 of the groove 102 so that the pad 68 is again held in a horizontal attitude, but now on the lower side of the transfer member with the bead in contact with the mateable surface of the work-piece 16.

Exceptionally smooth and precise movement and operation of the transfer member 66 are achieved through two coil springs 114 and 116 (FIGS. 1 and 4) located on the shaft 94. The outer ends of the coil springs 114 and 116 are suitably affixed to the bearing blocks 90 and 92, respectively, while the inner ends of the coil springs 114 and 116 are suitably affixed to the transfer member 66 or to suitable brackets extending therefrom. As shown, the spring ends are received in holes in the respective elements.

Figure 2:
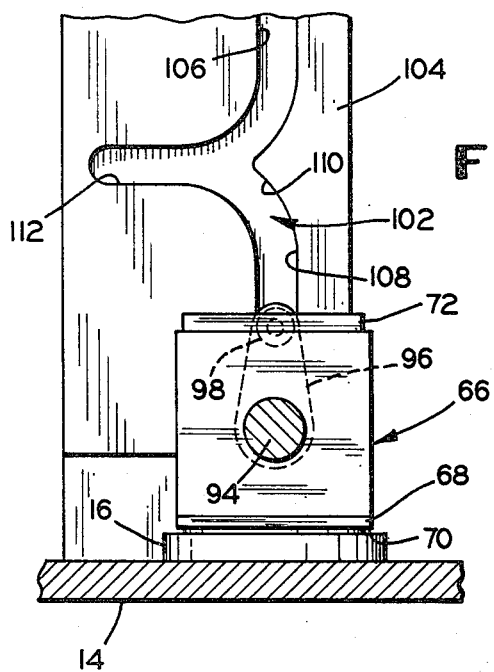
FIG. 2 is a fragmentary, schematic view in transverse section of portions of the apparatus of FIG. 1, shown in a different position.

The springs are coiled in opposite directions and are in substantially unstressed or neutral conditions when the cam follower 98 is in the branch 112 of the groove 102 and the surface 70 is vertical, as shown in FIG. 1. As the block 66 moves from that position upwardly toward the position of FIG. 3, one of the springs is more tightly coiled and stressed so as to urge the cam follower 98 and the arm 96 in a clockwise direction, as viewed in FIG. 3. Similarly, when the transfer member 66 is moved from the position of FIG. 1 toward the position of FIG. 2, the other of the coil springs is more tightly coiled and stressed so as to urge the cam follower 98 and the arm 96 in a counterclockwise direction. This assures smooth transmission of the cam follower between the upper and lower straight portions 106 and 108 of the cam groove 102. It also assures that the cam follower rides on the same edges of the groove 102 in all instances to assure more precise positioning of the transfer member 66 in the upper and lower positions.

Of course, when the cam follower 98 moves in either direction from the branch 112, both of the coil springs 114 and 116 move from their unstressed condition. However, the one of the coil springs being coiled more tightly is stressed more fully and produces greater torque on the shaft 94 than the other of the springs which tends to be uncoiled.

The apparatus according to the invention can also be used to apply beads of other viscous materials in additional gasket-forming material.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Apparatus for applying a bead of gasket-forming material in a pattern of predetermined size and shape to a mateable surface of a workpiece, said apparatus comprising a source of gasket-forming material, a transfer member having a transfer surface conforming to the mateable surface of the workpiece to which the bead of gasket-forming material is to be applied, applicator means for applying gasket-forming material to said transfer surface of said member from said source in the shape of the bead to be applied to the mateable surface, means for supporting the workpiece, means for moving said transfer member toward and away from the workpiece and said applicator means, and cam means for moving said transfer member in an arcuate path between a position with the transfer surface adjacent the mateable surface of the workpiece when on said support and a position with the transfer surface adjacent said applicator means.

2. Apparatus according to claim 1 wherein said cam means comprises a cam follower, means connecting said cam follower and said transfer member, and means forming a groove receiving said cam follower, said groove being of a shape to cause said transfer member to move in the arcuate path when moving between said workpiece and said applicator means.

3. Apparatus according to claim 2 characterized by said means connecting said cam follower and said transfer member comprising a shaft attached to said transfer member and an arm extemding transversely from said shaft to said cam follower.

4. Apparatus according to claim 2 characterized by said means connecting said cam follower and said transfer member comprising a shaft attached to said transfer member and an arm extending transversely from said shaft to said cam follower.

5. Apparatus according to claim 2 characterized by said groove having an upper straight portion and a lower straight portion aligned with the upper straight portion, said groove further having an intermediate branch extending transversely to both said upper and lower straight portions.

6. Apparatus according to claim 4 characterized by said shaft extending outwardly on both sides of said transfer member, bearing means on both sides of said transfer member for rotatably supporting said shaft, said shaft extending through one of said bearing means and connected to said cam follower beyond said one bearing means.

7. Apparatus according to claim 6 characterized by a first coil spring on said shaft on one side of said transfer member and wound in one direction, said coil spring having ends affixed to one of said bearing means and said transfer member, and a second coil spring on said shaft on the other side of said transfer member and wound in the other direction and having ends affixed to the other of said bearing means and said transfer member.

8. Apparatus for applying a bead of viscous material to a mateable surface of a workpiece, said apparatus comprising a source of the viscous material, a transfer member having a transfer surface conforming to the mateable surface of the workpiece to which the bead is to be applied, applicator means for applying viscous material to said transfer surface of said transfer member from said source in the shape of the bead to be applied to the mateable surface, means for supporting the workpiece, means for moving said transfer member toward and away from the workpiece and said applicator means, a cam follower connected with said transfer member, and means forming a groove receiving said cam follower, said groove being shaped to cause said cam follower to move said transfer member in an arcuate path between a position with the transfer surface adjacent the mateable surface of the workpiece and a position with the transfer surface adjacent said applicator means.

9. Apparatus according to claim 8 characterized by said groove being shaped to cause said transfer member to move in an arcuate path of 180° when moving between the workpiece and said applicator means.

10. Apparatus according to claim 8 characterized by said cam follower being connected to said transfer member by a shaft attached to said transfer member and an arm extending transversely from said shaft to said cam follower.

11. Apparatus according to claim 8 characterized by said groove having an upper straight portion and a lower straight portion aligned with the upper straight portion, said groove further having an intermediate branch extending transversely to both said upper and lower straight portions.

12. Apparatus according to claim 10 characterized by said shaft extending outwardly on opposite sides of said transfer member, bearing means on opposite sides of said transfer member for rotatably supporting said shaft, and means connecting said bearing means and said means for moving said transfer member toward and away from the workpiece and said applicator means.

13. Apparatus according to claim 12 characterized by said shaft extending through one of said bearing means and connected to said cam follower beyond said one bearing means.

14. Apparatus according to claim 12 characterized by a first coil spring on said shaft on one side of said transfer member, said coil spring being wound in one direction on said shaft and having ends affixed to one of said bearing means and said transfer member, and a second coil spring on said shaft on the other side of said transfer member and wound in the other direction on said shaft and having ends affixed to the other of said bearing means and said transfer member.

15. Apparatus according to claim 11 characterized by resilient means connected to said transfer member and being substantially unstressed when said cam follower is in said intermediate branch of said groove.

16. Apparatus according to claim 11 characterized by first resilient means connected to said transfer member, second resilient means connected to said transfer member, said first and second resilient means being substantially unstressed when said cam follower is in said intermediate branch of said groove, one of said resilient means being stressed more than the other one when said cam follower is in the upper straight portion of said groove, and the other of said resilient means being stressed more than the one when said cam portion is in the lower straight portion of said groove, whereby said transfer member is urged in opposite directions when said cam follower is in the upper and lower straight portions of said groove.

* * * * *